G. W. MOULTON.
BALE-TIE.

No. 173,737.

Patented Feb. 22, 1876.

Witnesses.
E. W. Cross
G. Wright

Inventor
G. W. Moulton
Per Burridge & Co,
Attys.

UNITED STATES PATENT OFFICE.

GEORGE W. MOULTON, OF CLEVELAND, OHIO.

IMPROVEMENT IN BALE-TIES.

Specification forming part of Letters Patent No. 173,737, dated February 22, 1876; application filed December 27, 1875.

*To all whom it may concern:*

Be it known that I, G. W. MOULTON, of Cleveland, in the county of Cuyahoga and State of Ohio, have invented certain new and useful Improvements in Bale-Ties, of which the following is a description, reference being had to the accompanying drawings making part of this specification, in which—

Figure 1:
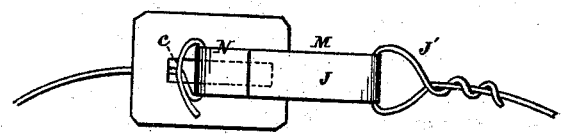
Figure 2:
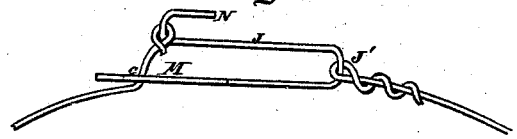

Figure 1 is a plan view of the tie. Fig. 2 is a side view of the same.

Like letters of reference refer to like parts in the views presented.

This invention is a bale tie or lock for securing the ends of a band, whereby a bale is bound for transportation, the construction of which is as follows: The tie consists of a single plate of metal, M, having one of its ends opened out, forming a head, as will be seen in Fig. 1. In said head is made a slot, $c$. The opposite end of the plate is narrowed down, forming a stem, which is then bent upward and back upon itself, and over the head, making a hook, J, Fig. 2. The extreme end of said hook is turned back over the hook J, thereby forming a hook, N, substantially as shown in the drawings, Figs. 1 and 2.

This tie is for the use of wire bands, and which is applied to the bale as follows: In one end of the wire band is made a loop, J', which is put on the hook J, as shown in the drawings. The wire is then carried around the bale, and the end thereof passed up through the slot $e$ of the head of the tie. A turn of the wire is then taken around the hook N, as shown in Figs. 1 and 2, thus completing the practical application of the band and tie to the bale.

I claim—

A bale tie or lock constructed substantially as herein described, and for the purpose specified.

GEORGE W. MOULTON.

Witnesses:
J. H. BURRIDGE,
E. W. CROSS.